(12) United States Patent
Stover et al.

(10) Patent No.: US 6,975,472 B2
(45) Date of Patent: Dec. 13, 2005

(54) HEAD WITH HEATING ELEMENT AND CONTROL REGIME THEREFOR

(75) Inventors: Lance E. Stover, Eden Prairie, MN (US); Jane Katherine Gates, Minneapolis, MN (US); Ladislav Rudolf Pust, Savage, MN (US); John L. Brand, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 15 days.

(21) Appl. No.: 10/662,068

(22) Filed: Sep. 12, 2003

(65) Prior Publication Data

US 2005/0057841 A1    Mar. 17, 2005

(51) Int. Cl.$^7$ ............................................. G11B 5/02
(52) U.S. Cl. ............... 360/59; 360/55; 360/25; 360/97.01; 360/97.02; 360/294.7; 360/128
(58) Field of Search ............... 360/59, 55, 69, 360/25, 88, 97.02, 294.7, 128, 75, 68; 219/494, 219/482–483, 489–492

(56) References Cited

U.S. PATENT DOCUMENTS

| | | | |
|---|---|---|---|
| 5,164,869 A | 11/1992 | Fontana, Jr. et al. | 360/113 |
| 5,781,377 A | 7/1998 | Koka et al. | 360/103 |
| 5,991,113 A * | 11/1999 | Meyer et al. | 360/75 |
| 6,074,566 A | 6/2000 | Hsiao et al. | 216/2 |
| 6,181,514 B1 | 1/2001 | Santini et al. | 360/126 |
| 6,330,128 B1 | 12/2001 | Chang et al. | 360/126 |
| 6,349,014 B1 | 2/2002 | Crue, Jr. et al. | 360/123 |
| 6,396,660 B1 | 5/2002 | Jensen et al. | 360/126 |
| 6,466,404 B1 | 10/2002 | Crue, Jr. et al. | 360/126 |
| 6,822,819 B1 * | 11/2004 | Gillis et al. | 360/59 |

FOREIGN PATENT DOCUMENTS

| | | | |
|---|---|---|---|
| JP | 02-201679 | * | 8/1990 |
| JP | 02-206010 | * | 8/1990 |

OTHER PUBLICATIONS

U.S. Appl. No. 10/462,242, filed Jun. 16, 2003, Pleiss.

* cited by examiner

*Primary Examiner*—David Hudspeth
*Assistant Examiner*—Natalia Figueroa
(74) *Attorney, Agent, or Firm*—Westman, Champlin & Kelly, PA (57) ABSTRACT

A head with a heating element and control regime therefor is disclosed. In embodiments described, the control regime or controller energizes the heater or heating element to provide intermittent heating between read or write operations to optimize transducer temperature and operating characteristics or parameters of a data storage device. In particular, in one embodiment described, the controller provides a low amplitude signal or current to provide low grade thermal heating. In another embodiment, the controller provides a high amplitude signal or current to preheat the transducer portion for write operations.

20 Claims, 7 Drawing Sheets

HEAD WITH HEATING ELEMENT AND CONTROL REGIME THEREFOR

FIELD OF THE INVENTION

The present invention relates generally to a data storage device, and more particularly but not by limitation to a head having a heating element and a control regime therefor.

BACKGROUND OF THE INVENTION

Data storage devices store digitally encoded information on discs. Heads read data from or write data to discs which are supported for rotation relative to a base chassis by a spindle motor or drive. Heads include transducer elements, such as magnetoresistive, magneto-optical or inductive elements for read or write operations. An actuator assembly moves the heads relative to select data tracks on the disc for read or write operations.

Typically the head includes a slider having an air bearing surface which is coupled to a head suspension assembly. Rotation of the disc creates an air flow along the air bearing surface of the slider to provide a lift force. The lift force of the air bearing surface is countered by a load force supplied via the suspension assembly to define in part a fly height $H_{fly}$ of the slider relative to the disc surface. The slider is coupled to the head suspension assembly via a gimbal spring so that the slider pitches and rolls to follow the topography of the disc surface. The slider generally flies at a pitch angle so that a trailing edge or portion of the slider or head defines a close point of the head relative to the disc surface. The fly height $H_{fly}$ of the trailing edge is generally above a glide avalanche height of the disc to limit slider-disc contact.

The fly height $H_{fly}$ parameters of the head effect spacing between the transducer elements of the head and a magnetic or data layer of the disc. Following a "warm up period" increases in ambient temperature of the device and heat generated via write current can cause thermal expansion of the transducer portion (or pole tip protrusion) of the head relative to the slider body. Thermal expansion of the transducer portion provides a smaller separation between the transducer elements and the recording media. Prior to a "warm up" period and thermal expansion, the spacing between the transducer element or elements and the recording media may be too large for effecting writing on the first few sectors interfering with write operations. Energization of a heating element heats the transducer portion to limit interference with write operations prior to the "warm up" period.

Transducer elements of the head are typically embedded in an Alumina $Al_2O_3$ or other materials. Ambient moisture or condensation of ambient moisture can corrode or damage the transducer elements or portion of the head. Prior head designs include a diamond-like carbon layer or protective layer deposited on the transducer or portion to protect the transducer portion or elements from corrosion or wear. The protective layer increases the spacing between the transducer element or elements and the media relative to the fly height of the head or slider. Embodiments of the present invention provide solutions to these and other problems, and offer other advantages over the prior art.

SUMMARY OF THE INVENTION

The present invention relates to a head with a heating element and control regime therefor. In embodiments described, the control regime or controller energizes the heater or heating element to provide intermittent heating prior to or between read or write operations to optimize transducer temperature and operating characteristics or parameters of a data storage device. In particular, in embodiments described, the controller provides a low amplitude signal or current to energize the heating element to provide low grade thermal heating. In one embodiment, the controller energizes the heater or element or supplies a high amplitude signal or current to preheat the transducer portion for write operations. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
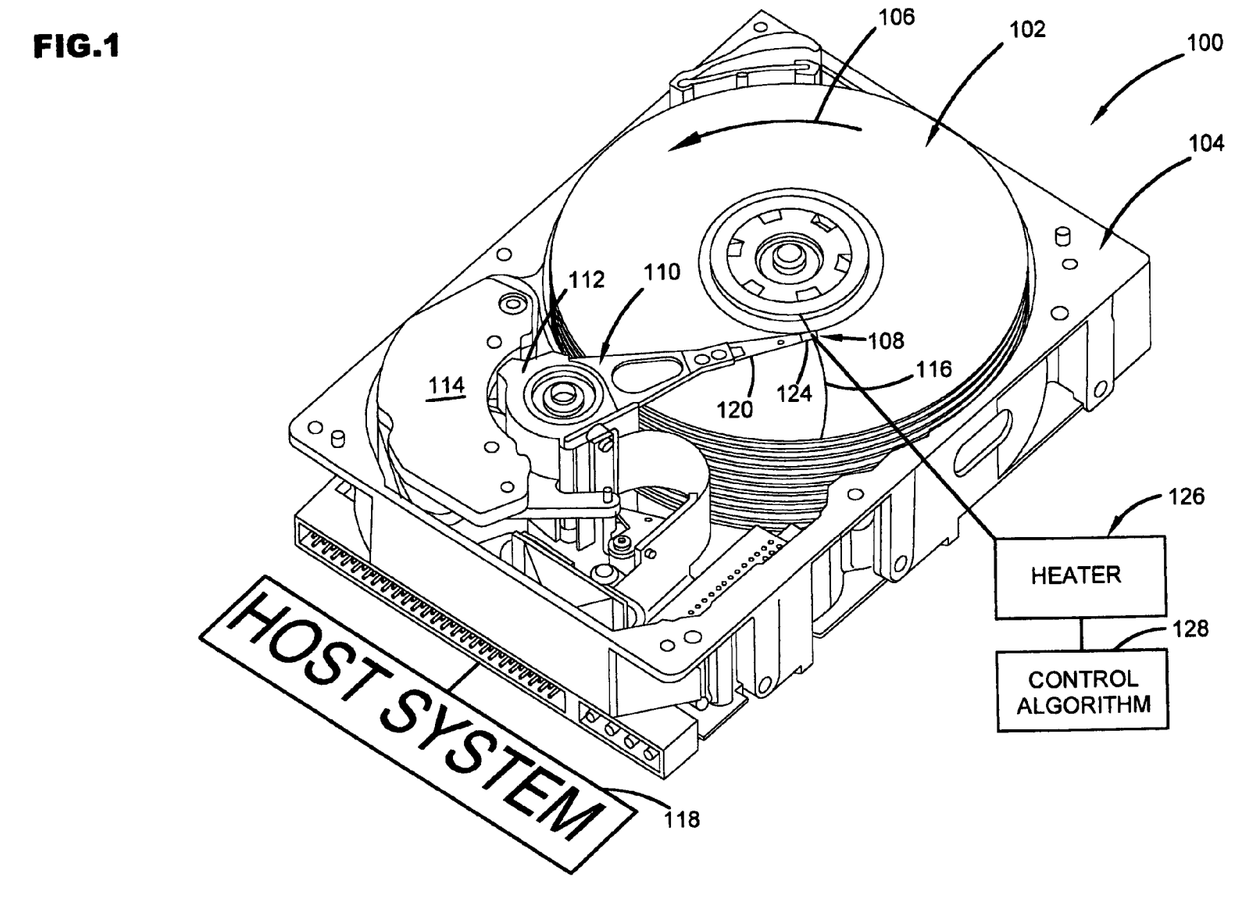
FIG. 1 is a perspective illustration of a data storage device or system including a heater and control algorithm or regime therefor.

FIG. 1 is a perspective illustration of a data storage device 100 in which embodiments of the present invention are useful. Device 100 includes a plurality of discs 102 rotationally coupled to a base chassis 104 via a spindle motor (not shown) as illustrated by arrow 106. Heads (such as for example, magnetoresistive, magneto-optical or inductive heads) are coupled to an actuator assembly 110 to position the heads 108 to read data from or write data to the discs 102. In the embodiment shown, the actuator assembly 110 includes an actuator 112 which is rotated via operation of a voice coil motor (VCM) 114 to move the head 108 as illustrated by arrow 116 relative to selected tracks on the disc 102 based upon commands or signals from a host computer or system 118 (illustrated schematically). In the embodiment shown, the head 108 is coupled to the actuator 112 via a head suspension assembly 120 and a gimbal spring (not shown) to allow the head 108 to pitch and roll to follow the topography of the disc surface. For a head including a slider 124 and air bearing surface, rotation of the disc creates an air flow along the air bearing surface of the slider 124 to provide a lifting force which is countered by a load force of the suspension assembly 120 to define in part a fly height of the head 108 above the disc surface. The present invention relates to a heater or heating element 126 proximate to the head 108 and a control regime or algorithm 128 therefor as illustrated schematically in FIG. 1.

Figure 2:
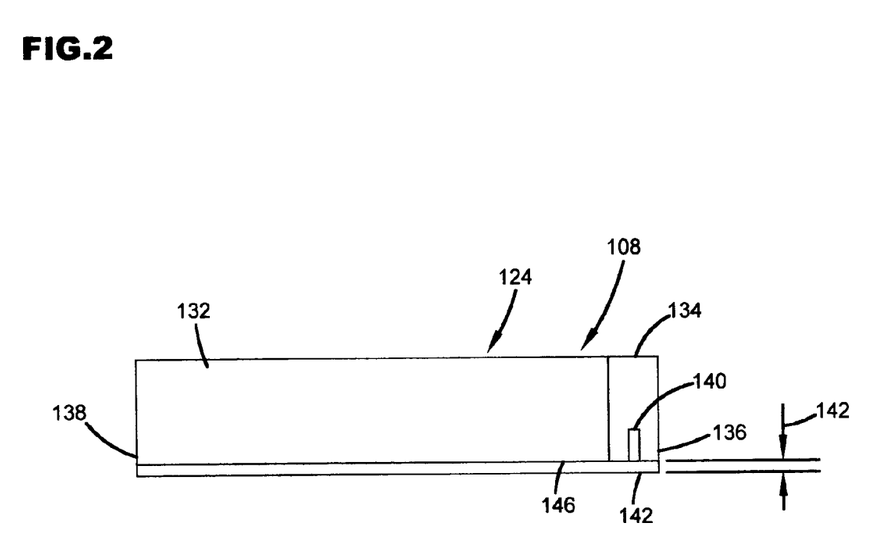
FIG. 2 illustrates a head or slider having embedded transducer elements.

In particular, in the embodiment shown in FIG. 2, the head 108 or slider 124 includes a substrate or body 132 (for example an $Al_2O_3$—TiC substrate) and a transducer portion 134 fabricated proximate to a trailing edge 136 of the slider 124 and spaced from a leading edge 138 of the slider. As schematically shown, a transducer element or elements 140 of the head are embedded within the transducer portion (e.g. embedded in an alumina material) and are recessed from the trailing edge 136 or end surface of the slider or head. Environmental temperature and humidity can lead to corrosion or degradation of the transducer elements or components. Prior to use or warm-up, the temperature of the head and transducer components are assumed to be at an ambient temperature.

If at any time, the ambient temperature increases at a rate faster or is maintained higher than that of the transducer a temperature differential (or difference) can develop whereby the transducer temperature is cooler than the ambient temperature. This temperature differential can increase the likelihood that ambient moisture will condense proximate to the transducer components or head. This condensation of moisture can accelerate corrosion and/or wear of the transducer components or elements of the head. Typically, a protective layer (such as a diamond like carbon), as illustrated at 142, is deposited or fabricated on the transducer portion to protect the transducer elements from wear and/or corrosion. Although the protective layer provides corrosion protection, the protective layer increases head-media spacing between the transducer elements and media or disc. Disc drive density is increasing requiring smaller spacing between the transducer elements and the recording layer on the disc surface (i.e. head-media spacing) for desired read write resolution or clarity. Reductions in head-media spacing are restricted by the physical fly height $H_{fly}$ or clearance characteristics of the slider and the added dimension of a protective layer.

Figure 3:
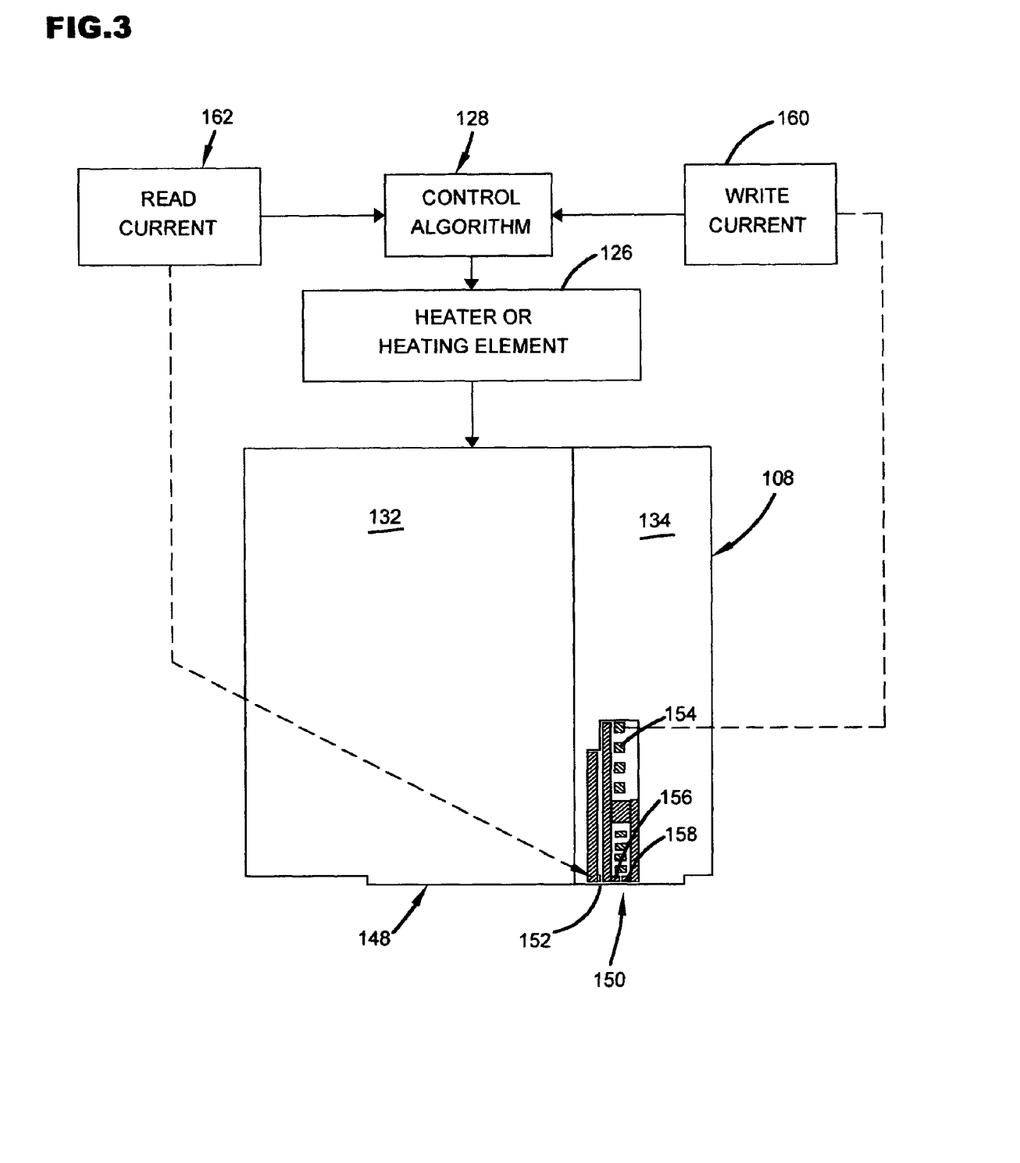
FIG. 3 illustrates a head or slider having a heater proximate to a transducer portion of a head and control algorithm or regime therefor.

The heater or heating element 126 and control regime 128 therefor, according to embodiments of the present invention, optimize operations of the data storage device and parameters of the head. In the embodiment shown in FIG. 3, the head includes an air bearing surface 148, an inductive write element 150 and a read sensor 152, although application of the present invention is not limited to a head including a read and write element or the particular read or write element shown. The inductive write element includes a coil 154 and poles 156, 158. During a write operation or write interval, a write current 160 is supplied to coil 154 of the write element 150 to energize poles 156, 158 for write operations and current 162 of the read sensor such as a magnetoresistive sensor is used to read encoded data from the disc or recording media. Read and write current 160, 162 generate heat to increase the temperature of the transducer portion or elements 150, 152 during read or write operations as illustrated by temperature profile 164 of FIG. 4.

Figure 4:
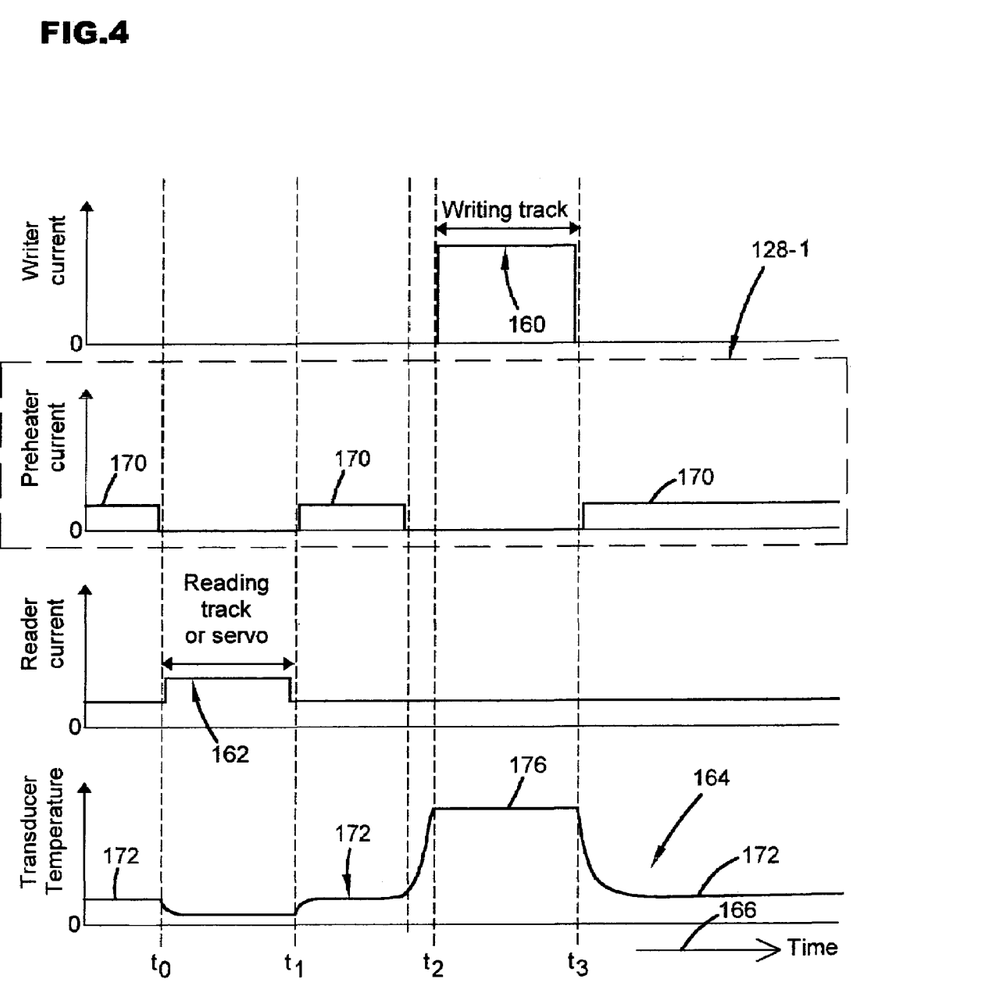
FIG. 4 graphically illustrates an embodiment of a control regime for energizing a heater or heating element proximate to a transducer portion of a head.

In the embodiment illustrated in FIG. 4, control algorithm or regime 128-1 energizes the heater or heating element 126 to provide intermittent heating prior to or between read current 162 and write current 160 to provide a relatively stable or elevated transducer temperature. In the illustrated embodiment where the system has a read current 162 during a first period $t_0$–$t_1$ and a write current 160 during a second period $t_2$–$t_3$, along time axis 166, the control algorithm 128-1 energizes the heating element 126 during intermittent period $t_1$–$t_2$ spanning between the first period $t_0$–$t_1$ and the second period $t_2$–$t_3$ to provide intermittent heating for an intermittent heating mode.

In particular, in the embodiment shown, the control algorithm 128-1 supplies a low amplitude signal or current 170 during intermittent period $t_1$–$t_2$. The low amplitude signal or current 170 provides a relatively low grade thermal response or profile 172 relative to an elevated thermal response or profile 176 during a write operation (e.g. thermal heating due to write current). The low grade thermal heating increases the temperature of the transducer relative to ambient to protect the transducer during intermittent periods between read or write operations. The low grade thermal heating 172 is below the temperature profile 176 or thermal response of the write current to limit interference with read write operations.

As illustrated in FIG. 4, the system provides a low amplitude signal or current 170 to energize the heater 126 prior to read or write operations to maintain a relatively stable or minimum steady state head temperature to reduce head temperature variations for the data storage device. In one embodiment, the control regime provides long term heating to maintain an elevated or minimum transducer temperature (relative to ambient) during operation of the device to reduce condensation of moisture to protect the head or transducer elements from corrosion or other damage related to humidity and exposure. The long term heating provides a corrosion protection system that enables a reduction in head-media spacing by reducing or eliminating a need for previous protection layers. In one embodiment, the heating element may provide corrosion protection in addition to a protection layer and application is not limited to a head without a protection layer or layers. The low amplitude signal or current 170 is sufficiently low to limit power consumption requirements of the device.

Heat and, in particular, heat generated by a write current, can cause expansion or protrusion (pole tip protrusion) of the transducer elements relative to the slider body 132. In particular, in a pre-expanded profile, the transducer elements (pole tips) may be recessed from the air bearing surface as a result of lapping or fabrication processes. During operation, residual heat expands the transducer portion so that the transducer elements (or pole tips) protrude below the air bearing surface reducing head media spacing parameters relative to the pre-expanded profile. Prior to "warm up" or pre-protrusion, head-media spacing may be too large for effective writing on the first few sectors.

Figure 5:
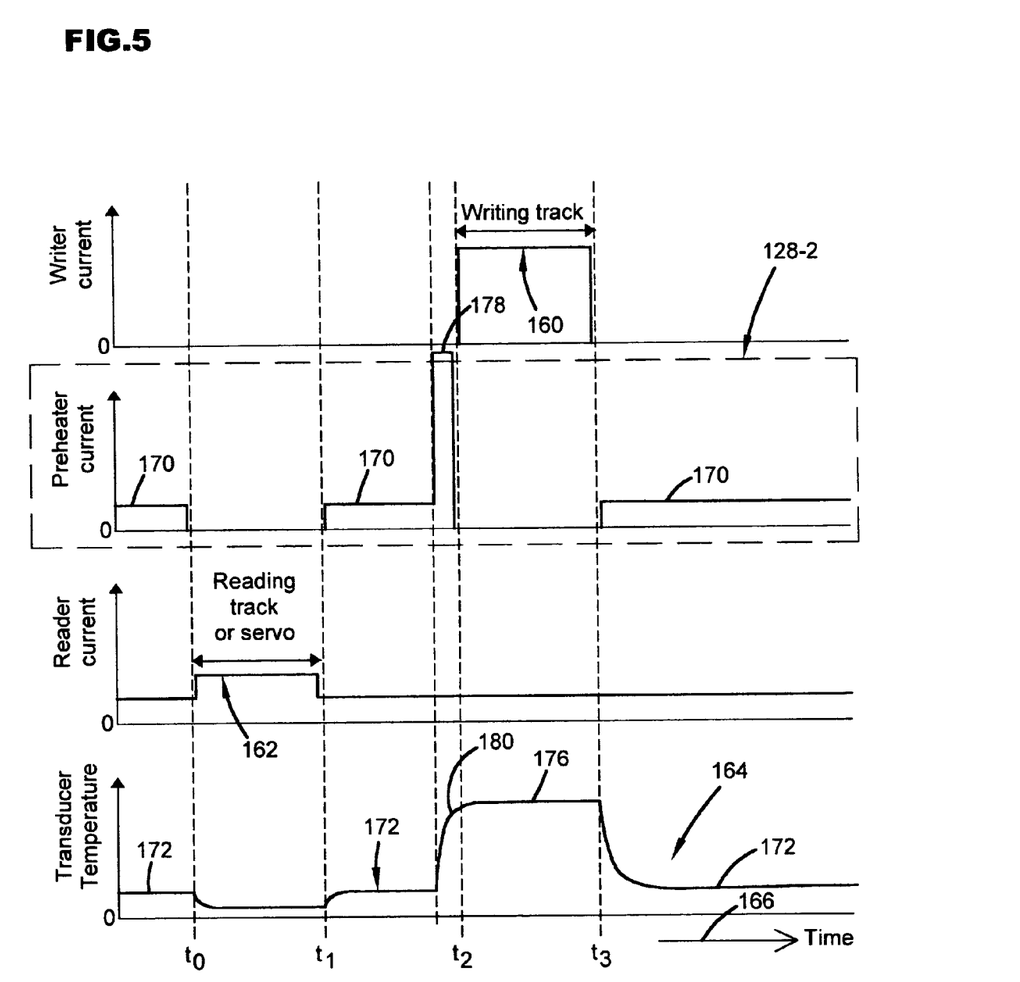
FIG. 5 graphically illustrates an embodiment of a control regime for energizing a heater or heating element proximate to a transducer portion of a head.

In the illustrated embodiment of FIG. 5, the control algorithm 128-2 includes a preheat mode prior to write operations and an intermittent heating mode between write and read operations, although application of the present invention is not limited to the control algorithm embodiment and preheat mode illustrated. During the preheat mode, the control algorithm 128-2 supplies a high signal or current 178 (relative to the low amplitude signal or current 170) to the heater or element to preheat the transducer or elements prior to a write operation to limit write errors. As shown, the signal or current 178 is relatively high compared to the low grade signal or current 170 of the intermittent heating mode to provide a high or rapid thermal response to preheat the transducer. In the embodiment shown, the control algorithm 128-2 provides a multiple amplitude signal or current (including a low amplitude signal or current 170 and a high amplitude signal or current 178) to provide sustained, low-grade thermal heating 172 (as illustrated by temperature profile 164) and rapid high-grade thermal heating 180 to preheat the transducer portion prior to write operations.

Figure 6:
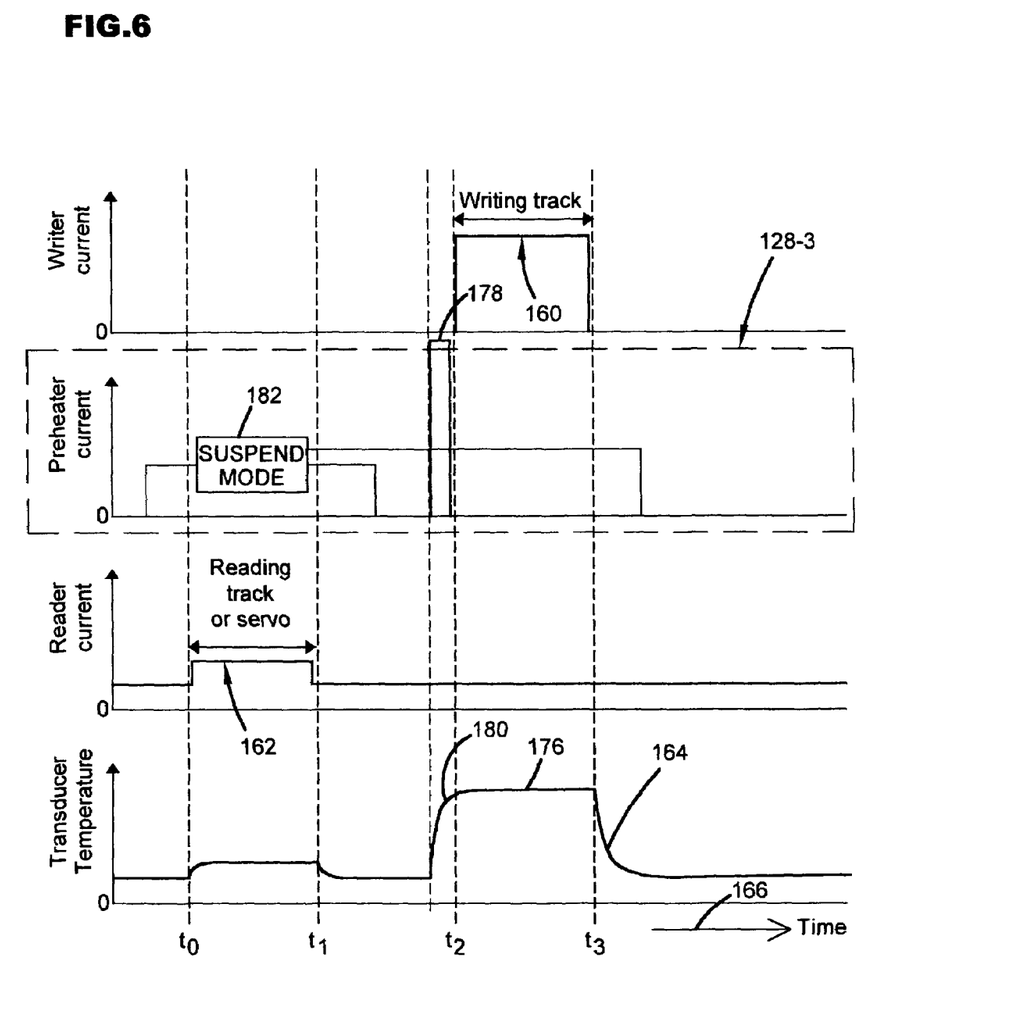
FIG. 6 graphically illustrates a control embodiment including a suspend mode.

In an illustrative embodiment of FIG. 6, a control algorithm 128-3 includes a suspend mode or period 182. During the suspend period, low grade thermal heating is suspended as comparatively illustrated (e.g. during intermittent period $t_1$–$t_2$). The suspend mode 182 is activated when the operating temperature (transducer temperature) is sufficiently warm. The suspend mode 182 suspends intermittent heating to reduce intermittent power consumption. For example, the control algorithm provides intermittent heat when the drive temperature is less than 45° C. When the operating temperature of the drive increases above, for example, 45° C., the intermittent heating is suspended. The suspend mode can be activated based upon feedback from a temperature sensor or based upon other operating criteria or feedback. In the embodiment shown, during the suspend mode, the heater is energized to preheat the writer to compensate for pole tip protrusion, although application is not limited to the preheat embodiment shown.

As shown, the heater or element 126 is fabricated proximate to the transducer or elements. The heater or heating element 126 is energized separately from the transducer elements or components to limit interference with read or write operations or recorded data. For example, the heater can be fabricated on the slider body separate from the transducer elements (for example, using known etching or deposition techniques). For example, in an illustrative embodiment, the heater or heating element can be a resistive heater element fabricated on the slider or slider body proximate to the transducer portion although application is not limited to a particular heating element. The heating element in an illustrative embodiment is energized via a dc or hf current.

Figure 7:
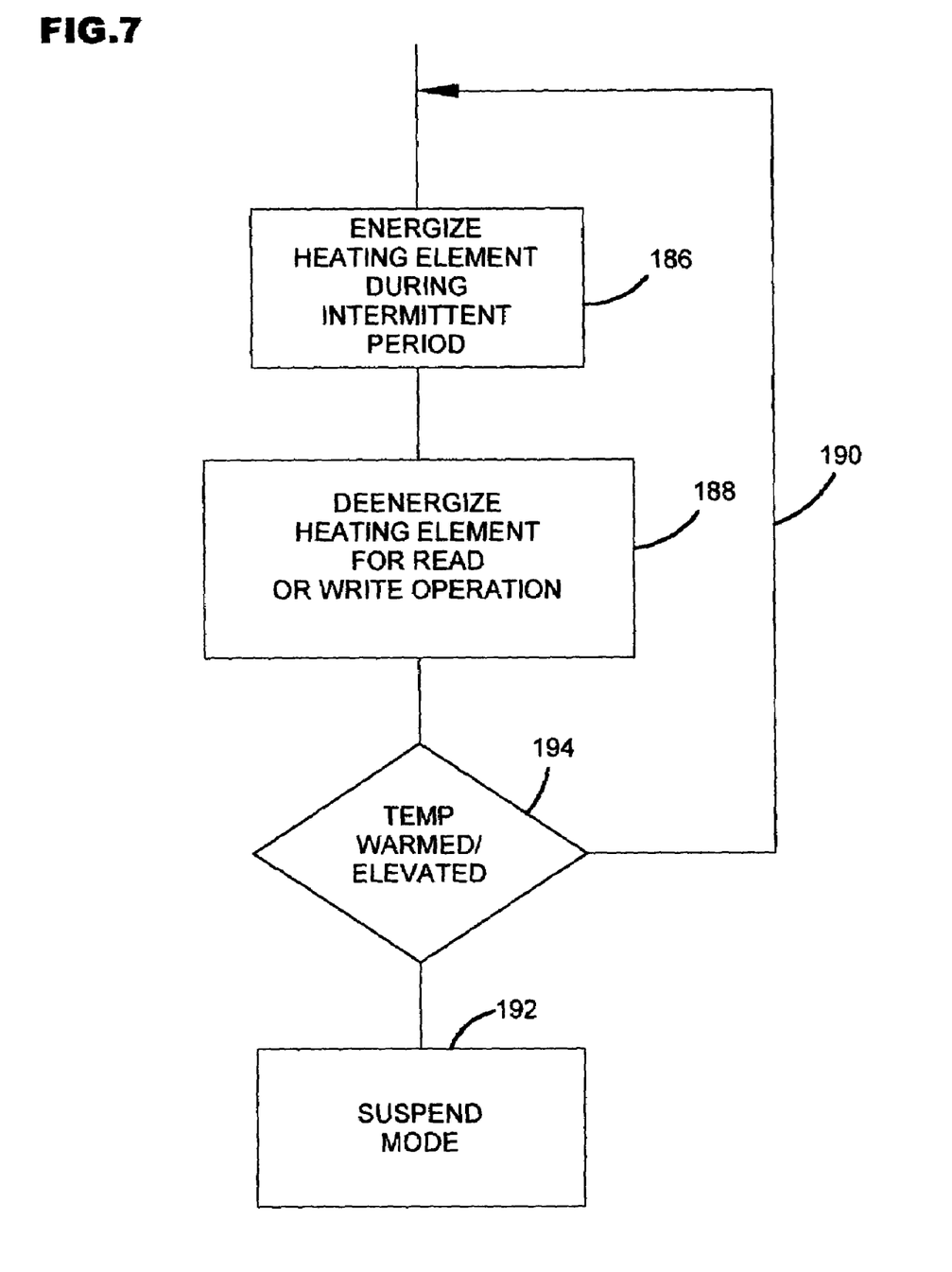
FIG. 7 is a flow diagram illustrating operating steps of an embodiment of the present invention.

Thus, as described, the present invention provides a regime to optimize or control head or transducer temperature via intermittent heating as illustrated by block 186 of FIG. 7. As shown, the heating element is energized during an intermittent period prior to a read or write operation as illustrated by block 186 and de-energized for a read or write operation as illustrated by block 188. Energization of the heating element, as illustrated by block 186, provides an elevated transducer temperature to control operating temperature ranges and to reduce condensation of ambient moisture. The heating element is re-energized following a read or write operation as illustrated by line 190. The control algorithm or regime suspends energization as illustrated by block 192 following a "warm up" period or once drive operating temperatures are in a desired range, as illustrated by block 194. Thus, the use of the heater element and control algorithm or regime optimizes the head operating temperature. The dynamic processes of 1) corrosion and 2) accumulation of head contaminants via lube pick up are moderated, thus improving tribological performance and mitigating head-disc contact.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic storage device, it will be appreciated by those skilled in the art that the teachings of the present invention can be applied to other data storage device or optical devices, without departing from the scope and spirit of the present invention.

What is claimed is:

1. An operating method for a data storage device comprising steps of:
    energizing a heating element proximate to a transducer portion of a head during an intermittent period prior to a read or write operation by supplying a signal or current having a relatively low amplitude to provide a relatively low grade thermal response or energization relative to energization of an inductive or write transducer element of the head; and
    de-energizing the heating element for the read or write operation.

2. The operating method of claim 1 and further comprising:
    re-energizing the heating element following the read or write operation.

3. The operating method of claim 1 wherein the heating element is energized via a controller including a suspend mode and comprising the step of:
    suspending the low grade energization of the heating element during the intermittent period prior to the read or write operation.

4. The operating method of claim 3 and further comprising the step of supplying a current or signal having a relatively high amplitude to preheat the transducer portion prior to the write operation during the suspend mode.

5. The operating method of claim 1 and comprising the step of:
    supplying a current or signal having a relatively high amplitude prior to the write operation to preheat the transducer portion prior to the write operation.

6. The operating method of claim 1 wherein the heating element is energized by a controller including an intermittent heating mode and a preheat mode and the controller supplies the low signal or energization relative to energization of the inductive or write transducer element of the head during the intermittent period for the intermittent heating mode and a higher signal or energization to preheat the transducer portion prior to the write operation in the preheat mode.

7. The operating method of claim 6 wherein the controller supplies a multiple amplitude signal or current to provide the low grade signal or energization during the intermittent period and the higher signal or energization during the preheat mode to preheat the head.

8. An operating method for a data storage device comprising steps of:
    having a write signal$_{write}$ or a read signal$_{read}$ during a first period $t_0$–$t_1$ and a write signal$_{write}$ or a read signal$_{read}$ during a second period $t_2$–$t_3$ and providing a signal$_{heat}$ or current$_{heat}$ to energize a heating element proximate to a transducer portion of a head during an interim period $t_0$–$t_1$; and
    de-energizing the heating element during the first $t_0$–$t_1$ and second $t_2$–$t_3$ periods.

9. The operating method of claim 8 wherein the signal$_{heat}$ or current includes a first amplitude to provide a first thermal response and a second amplitude higher than the first amplitude to provide a second thermal response.

10. The operating method of claim 8 wherein signal$_{heat}$ or current has a relatively low amplitude to provide a relatively low grade thermal response relative to energization of an inductive or write transducer element of the head.

11. An operating method for a data storage device comprising steps of:
    energizing a heating element proximate to a transducer portion of a head during an intermittent period prior to a read or write operation by supplying a signal or current to provide a relatively low grade thermal response to provide intermittent heating; and energizing the heating element by supplying a signal or current to provide a higher thermal response prior to a write operation to preheat the head.

12. The operating method of claim 11 wherein the heating element is energized by a controller including an intermittent heating mode and a preheat mode and the controller supplies a low grade signal or current to provide the intermittent heating and a larger amplitude signal or current to preheat the head for write operations.

13. The operating method of claim 12 wherein the controller supplies a multiple amplitude current or signal to provide the low grade thermal response for the intermittent heating and the higher thermal response to preheat the head.

14. A device comprising:
a head including a transducer portion to read or write relative to a recording media; and
a heater and a controller coupled to the heater and the controller configured to energize the heater during an intermittent period prior to a read or write operation to provide a relatively low grade thermal response relative to energization of an inductive or write element of the head and operable to de-energize the heater for the read or write operation.

15. The device of claim 14 wherein the controller includes a suspend mode to suspend the low grade energization of the heater.

16. The device of claim 15 wherein the controller energizes the heater to preheat the head prior to a write operation during the suspend mode.

17. The device of claim 14 wherein the controller includes multiple heating modes including an intermittent heating mode to energize the heater to provide the relatively low grade thermal response and a preheat mode to provide a higher thermal response relative to the low grade thermal response to preheat the transducer portion of the head.

18. The device of claim 14 wherein the controller energizes the heater during an interim period $t_1$–$t_2$ between read or write periods $t_0$–$t_1$ and $t_2$–$t_3$.

19. The device of claim 14 wherein the heater is separate from a transducer element or transducer elements of the head.

20. The device of claim 19 wherein the heater includes a resistive heating element.

* * * * *